United States Patent
Akin et al.

(10) Patent No.: US 10,409,727 B2
(45) Date of Patent: Sep. 10, 2019

(54) SYSTEM, APPARATUS AND METHOD FOR SELECTIVE ENABLING OF LOCALITY-BASED INSTRUCTION HANDLING

(71) Applicant: Intel Corporation, Santa Clara, CA (US)

(72) Inventors: Berkin Akin, Hillsboro, OR (US); Rajat Agarwal, Beaverton, OR (US); Jong Soo Park, Santa Clara, CA (US); Christopher J. Hughes, Santa Clara, CA (US); Chiachen Chou, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 90 days.

(21) Appl. No.: 15/475,249

(22) Filed: Mar. 31, 2017

(65) Prior Publication Data
US 2018/0285280 A1     Oct. 4, 2018

(51) Int. Cl.
| | | |
|---|---|---|
| *G06F 12/08* | (2016.01) | |
| *G06F 12/0888* | (2016.01) | |
| *G06F 12/0811* | (2016.01) | |
| *G06F 12/04* | (2006.01) | |
| *G06F 12/0831* | (2016.01) | |
| *G06F 12/0886* | (2016.01) | |

(52) U.S. Cl.
CPC ......... *G06F 12/0888* (2013.01); *G06F 12/04* (2013.01); *G06F 12/0811* (2013.01); *G06F 12/0831* (2013.01); *G06F 12/0886* (2013.01); *G06F 2212/1024* (2013.01); *G06F 2212/1028* (2013.01); *G06F 2212/283* (2013.01); *G06F 2212/6046* (2013.01)

(58) Field of Classification Search
CPC ............ G06F 12/0877; G06F 12/0888; G06F 12/0862; G06F 12/0811; G06F 12/0831
USPC ........................................................ 711/138
See application file for complete search history.

(56) References Cited

U.S. PATENT DOCUMENTS

| | | | | |
|---|---|---|---|---|
| 2005/0080997 A1* | 4/2005 | Hooker | ............... | G06F 9/30047 711/137 |
| 2014/0372699 A1* | 12/2014 | Desai | .................. | G06F 12/0893 711/118 |
| 2016/0019184 A1 | 1/2016 | Hughes et al. | | |
| 2017/0177349 A1* | 6/2017 | Yount | ................ | G06F 9/30029 |
| 2017/0300420 A1 | 10/2017 | Hughes et al. | | |

(Continued)

OTHER PUBLICATIONS

United States Patent and Trademark Office, Non-Final Office Action dated Aug. 24, 2018 and Reply to Office Action filed Nov. 16, 2018 in U.S. Appl. No. 15/475,244.

(Continued)

*Primary Examiner* — Than Nguyen
(74) *Attorney, Agent, or Firm* — Trop, Pruner & Hu, P.C.

(57) ABSTRACT

In an embodiment, a processor includes a sparse access buffer having a plurality of entries each to store for a memory access instruction to a particular address, address information and count information; and a memory controller to issue read requests to a memory, the memory controller including a locality controller to receive a memory access instruction having a no-locality hint and override the no-locality hint based at least in part on the count information stored in an entry of the sparse access buffer. Other embodiments are described and claimed.

19 Claims, 11 Drawing Sheets

(56) References Cited

U.S. PATENT DOCUMENTS

2017/0374151 A1* 12/2017 Moorthi ............. H04L 67/1097
2018/0143911 A1*  5/2018 Moyer ................. G06F 12/123
2018/0285279 A1   10/2018 Akin et al.

OTHER PUBLICATIONS

United States Patent and Trademark Office, Final Office Action dated Jan. 30, 2019 and Reply filed on Mar. 28, 2019, in U.S. Appl. No. 15/475,244.

* cited by examiner

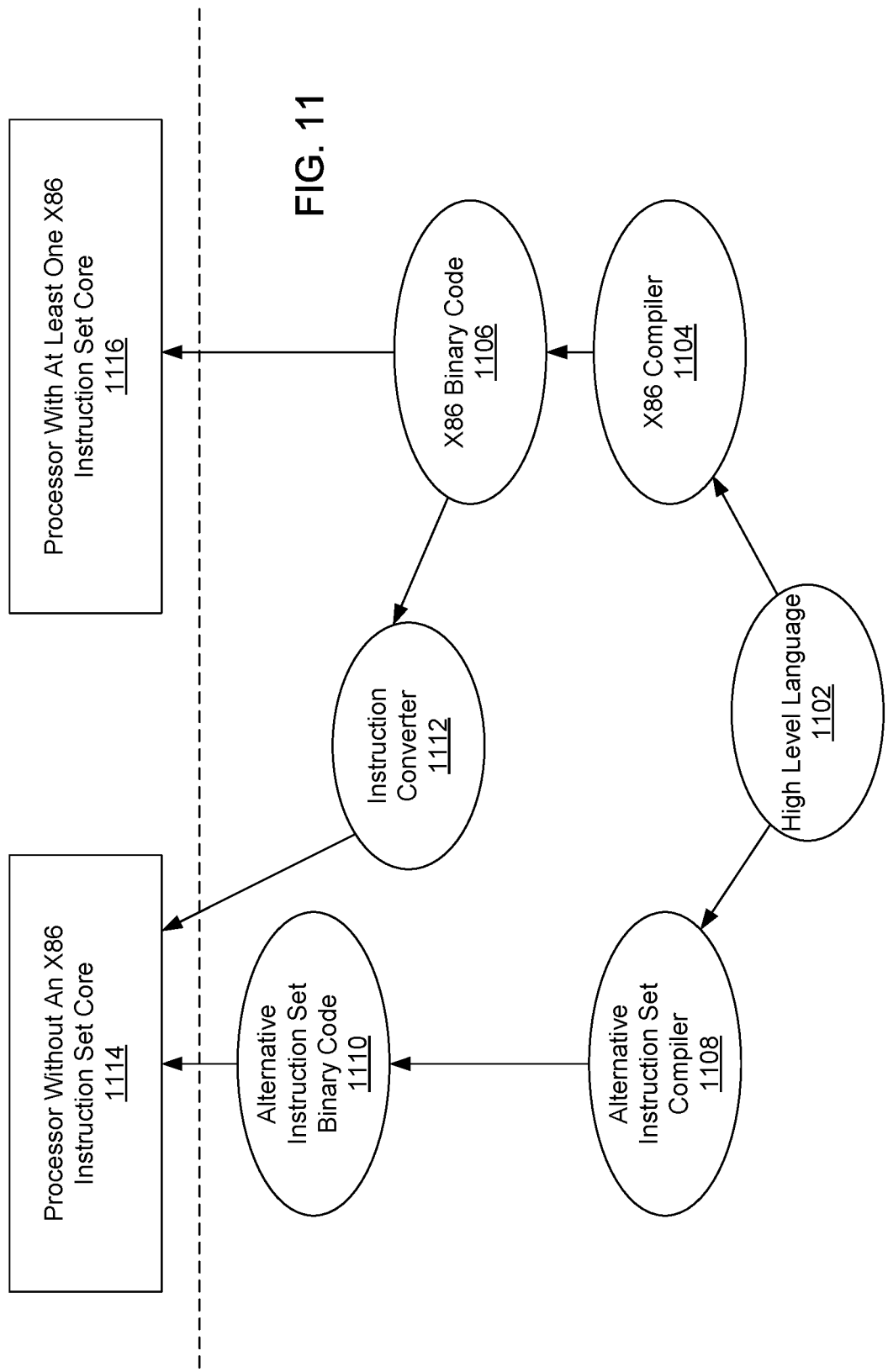

SYSTEM, APPARATUS AND METHOD FOR SELECTIVE ENABLING OF LOCALITY-BASED INSTRUCTION HANDLING

TECHNICAL FIELD

Embodiments relate to efficient handling of memory accesses in a computing system.

BACKGROUND

Sparse data processing workloads such as graph analytics perform irregular memory accesses. In some cases, these accesses are to large data structures, and are pseudo-random. In modern processors, full cache lines are fetched from memory and inserted into a cache memory. However, in many cases these lines are evicted before any reuse (either from spatial or temporal locality). This leads to both cache pollution and waste of external memory bandwidth. Newer memory interfaces provide fine-grain memory access capabilities, namely memory access less than a given memory line or cache line width. However sub-cache line memory accesses lead to partial cache lines in a processor cache hierarchy, which can complicate cache design.

BRIEF DESCRIPTION OF THE DRAWINGS

FIG. 11 illustrates a block diagram contrasting the use of a software instruction converter to convert binary instructions in a source instruction set to binary instructions in a target instruction set according to embodiments of the invention.

DETAILED DESCRIPTION

In various embodiments, a processor is configured to optimize handling of data exhibiting non-locality (referred to herein as no-locality data) by accessing such data in a potentially fine-grained manner and potentially bypassing storage in a cache memory. Some embodiments may leverage user-level no-locality memory access instructions that may be used to read and write data in a manner that bypasses the cache hierarchy. Such instructions may also be used to make fine-grain memory accesses as described herein. Although the scope of the present invention is not limited in this regard, such instructions include streaming load and store instructions, in response to which a core may issue several loads or stores for the individual data elements accessed that carry a hint that the memory accesses are to bypass storage in caches, and may be handled narrowly at a memory controller.

With the selective enabling of full width memory accesses in response to certain no-locality requests described herein, locality may be exploited when an access pattern actually is cache-friendly, e.g., if a data structure accessed in pseudo-random fashion fits in on-die caches, or if the data structure is unexpectedly accessed in a regular pattern, with lots of spatial locality. In this way, embodiments may exploit fine-grain memory access capabilities provided by newer memory technologies, without major changes to a cache hierarchy design while capturing locality in the accesses when it exists.

In embodiments, a processor includes microarchitectural support for "no-locality" (NL) loads. In contrast to non-temporal loads, NL loads imply neither temporal nor spatial locality. Such NL loads may cause a processor to look up the caches and return the data if a cache hit occurs, as with a conventional load. In contrast, if a miss occurs and the NL request is received at the memory controller, the memory controller causes a fine-grain memory access to occur to obtain a partial cache line from memory. Note that this partial cache line is not inserted into caches, but instead bypasses the caches and is provided directly to the core.

Figure 1:
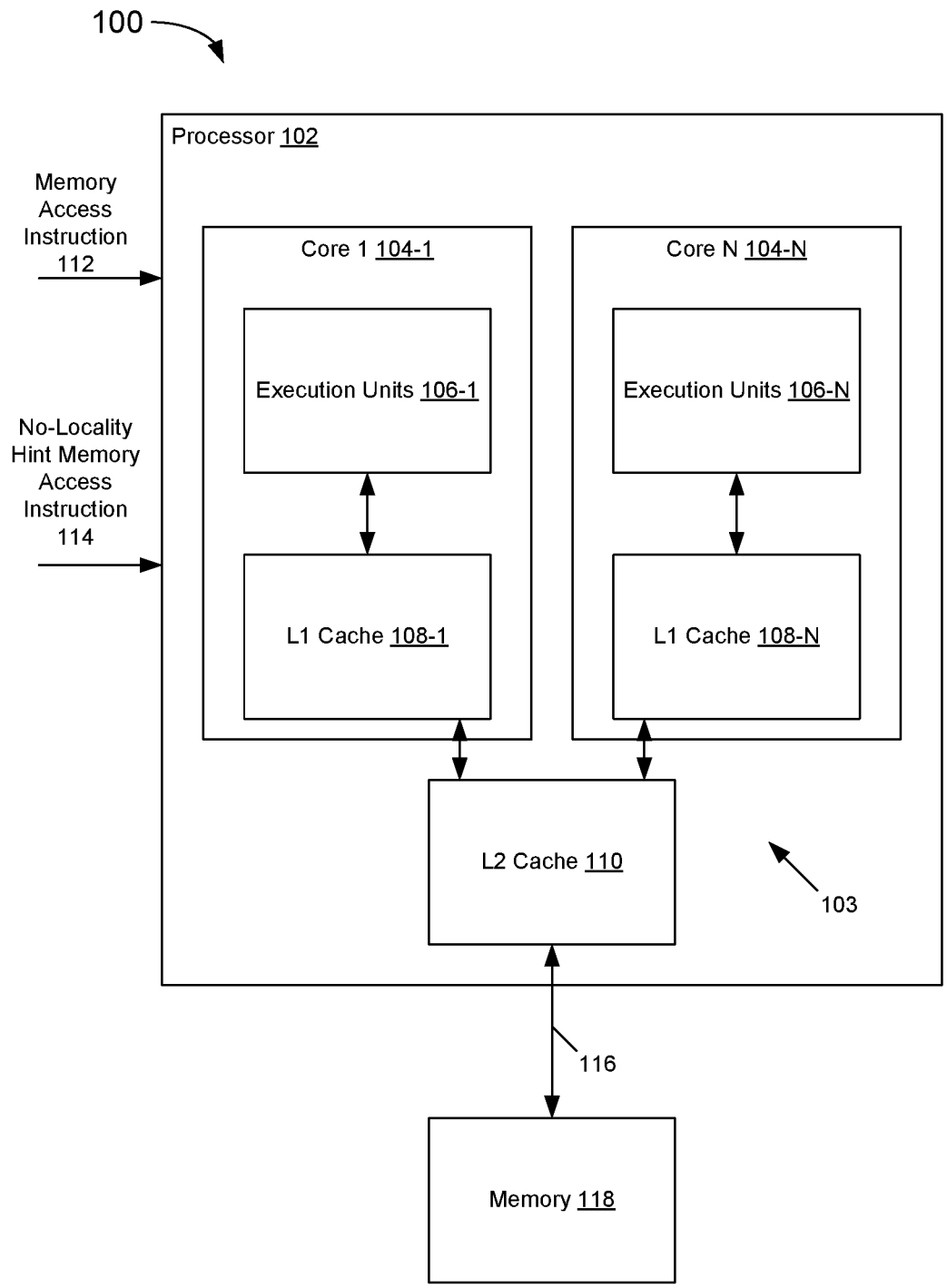
FIG. 1 is a block diagram of a system in accordance with an embodiment of the present invention.

FIG. 1 is a block diagram of an embodiment of a system 100 that includes a processor 102 having a cache hierarchy 103 and a memory 118. Processor 102 and memory 118 are coupled together by one or more interconnects 116. Processor 102 includes one or more cores 104. In the illustrated example, processor 102 includes a first core 104-1 optionally up to an Nth core 104-N. The processor may include any desired number of cores (e.g., often ranging from one to on the order of hundreds). Core 104-1 includes one or more execution units 106-1 and core 104-N includes one or more execution units 106-N.

Typically processor 102 may also have one or more caches 108, 110. The caches may represent relatively smaller and faster types of storage than memory 118. The caches may also be closer to the cores and/or execution units than memory 118. The caches may be used to cache or store data brought into the processor from memory 118 (e.g., in response to a given memory access instruction 112, e.g., a load instruction) to provide faster subsequent accesses to the data. When the processor seeks to read or write data with memory 118, it may first check to see if a copy of the data is stored in the caches. If the data is found in a cache, the processor may access the data from the cache more quickly than if the data were accessed from memory 118. As a result, including the caches may help to reduce the average amount of time needed to access data, which may enhance performance and/or throughput of the processor.

Referring still to FIG. 1, a cache hierarchy 103 includes multiple levels of caches that differ in their relative closeness to the cores and/or to the execution units of the processor. Core 104-1 has a first level cache or level 1 (L1) cache 108-1. Similarly, core 104-N has an L1 cache 108-N. Each of the L1 caches may be dedicated to the corresponding core in which it is included. The L1 caches represent the cache level closest to the cores. The processor also has a second level cache or level 2 (L2) cache 110. The L2 cache represents the next closest cache level to the cores. In some implementations, the L2 cache may be shared by the cores. Although not shown, there may optionally be one or more additional cache levels still further from the cores (e.g., a level 3 (L3) cache).

One reason for including caches in processors is that memory references often have a locality attribute. For example, references to data in memory often have temporal and/or spatial locality. Temporal locality implies that, when data is accessed from an address in memory, the same data is likely to be accessed again within a short period of time. By way of example, this may be the case when a same value is to be reused in a loop, is used repetitively in a set of calculations, or for various other reasons. In such cases, it may be beneficial, after accessing the data from the memory, to store the data in a cache so that subsequent accesses to the data may be performed more quickly from the cache instead of slowly from the memory.

Spatial locality implies that, when a given data is accessed from an address in memory, nearby data at nearby addresses is also likely to be accessed within a short period of time. By way of example, both sets of data may be part of the same content (e.g., an image, a table, a data structure, a video, etc.), and may be processed around the same time. Spatial locality may also occur for various other reasons. Caches take advantage of spatial locality by storing not only the data initially needed, but also nearby data from nearby addresses.

Typically, the minimum amount of data accessed from the memory and stored in the cache is a full width cache line amount of data, even when only a much smaller amount of data may initially be needed. For example, typically an entire 512-bit cache line may be accessed from memory and stored in the cache even if only a single 8-bit, 16-bit, 32-bit, 64-bit, or 128-bit data element is initially needed. If spatial locality exists this will be beneficial since it is likely that the additional data brought into the cache will also be needed in the near future.

During operation, data in the caches is continually changed by evicting data that is not likely to be needed in the near future to make room for data that is likely to be needed in the near future. Various replacement algorithms and policies are used, many of which are often heavily based on the age of the data (e.g., a least recently used indication) due to temporal locality.

Memory access instruction 112 takes advantage of temporal and/or spatial locality by storing data elements that have been gathered from memory 118 in cache hierarchy 103. Many applications and types of data show significant spatial and/or temporal locality in their access stream and thereby benefit from accessing and storing a whole cache line amount of data in the cache for each data element gathered. However, not all applications and/or types of data have sufficient temporal and/or spatial locality to justify accessing and storing whole cache lines in the caches for load and/or store instructions. Certain data elements may be needed once, but may be unlikely to be needed again in the near future. For example, this may be the case in certain streaming data applications, high performance computing applications, applications having a stream of very sparse memory accesses, and in various other applications. Moreover, in many cases a programmer and/or the software (e.g., an operating system) may be able to identify locality.

Referring still to FIG. 1, one or more cores 104 may receive and perform a no-locality hint memory access instruction 114 (e.g., a no-locality hint load instructions such as a no-locality hint load or gather instruction and/or a no-locality hint store instruction such as a no-locality hint store or scatter instruction). The hint may indicate that the data to be accessed (e.g., gathered or scattered) has insufficient spatial and/or temporal locality. In some embodiments, the no-locality hint may be a no-temporal locality hint. In other embodiments, the no-locality hint may be a no-spatial locality hint. In still other embodiments, the no-locality hint may be a no-temporal and no-spatial locality hint. In the case of a no-temporal locality hint, in some embodiments, gathered data elements may bypass cache hierarchy 103 and/or not be stored in cache hierarchy 103, which may help to reduce cache pollution. In the case of a no-spatial locality hint, in some embodiments, accesses to data elements may be performed with only sub-cache line amounts of data (e.g., half or quarter cache line amounts of data), or in some cases single data element amounts of data, which may help to reduce waste of interconnect bandwidth and/or reduce power consumption. Use of no-locality hint memory access instructions may help to improve performance and/or reduce power consumption at times when there is insufficient spatial and/or temporal locality.

Figure 2:
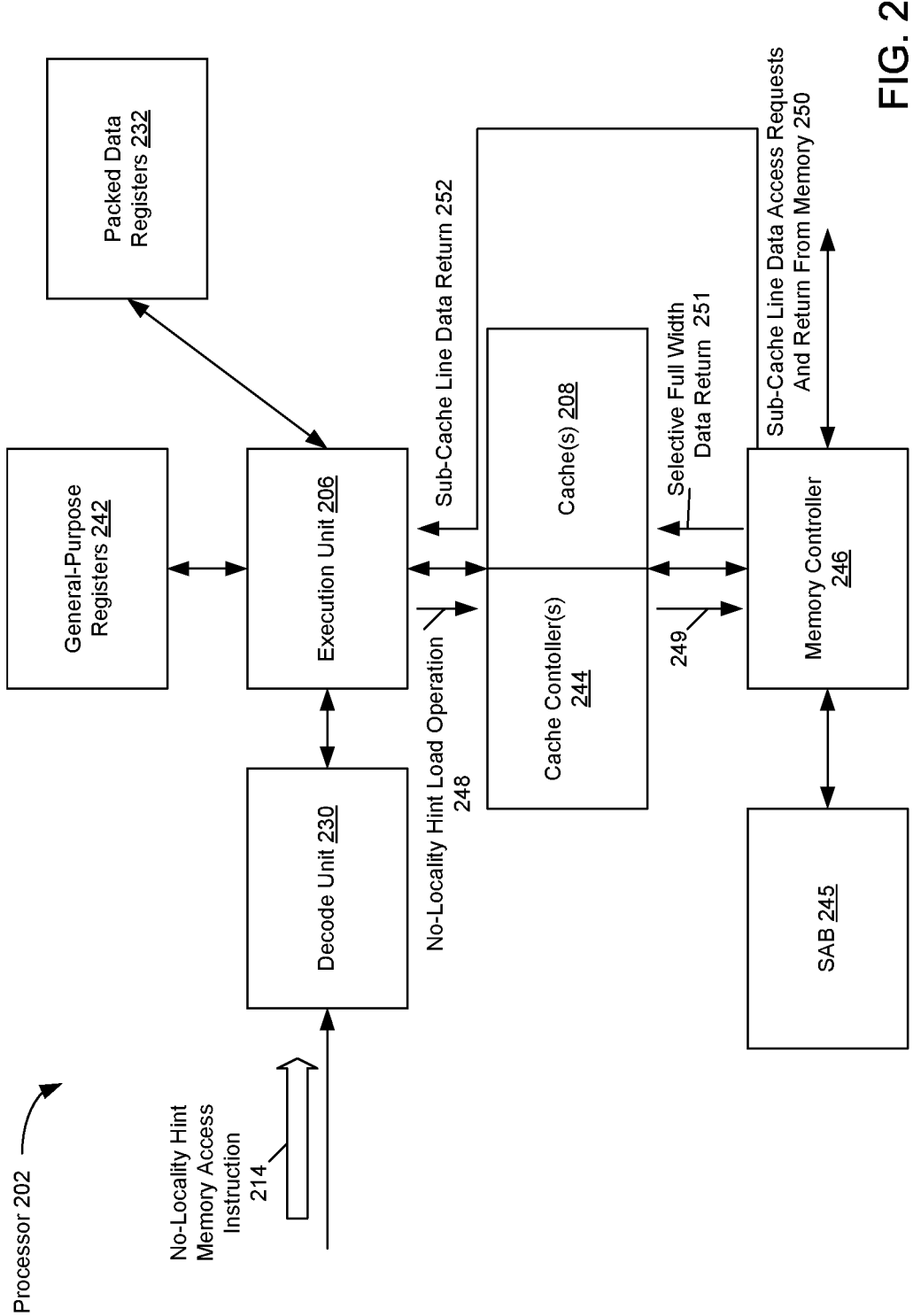
FIG. 2 is a block diagram of a processor in accordance with an embodiment of the present invention.

FIG. 2 is a block diagram of an embodiment of a processor 202 that is operable to perform an embodiment of a no-locality hint memory access instruction 214. The no-locality hint memory access instruction may also be referred to herein as a no-locality hint load instruction. In some embodiments, processor 202 may be a general-purpose processor (e.g., a general-purpose microprocessor or central processing unit (CPU) of the type used in desktop, laptop, or other computers). Alternatively, the processor may be a special-purpose processor. Examples of suitable special-purpose processors include, but are not limited to, graphics processors, network processors, communications processors, cryptographic processors, co-processors, embedded processors, digital signal processors (DSPs), and controllers (e.g., microcontrollers). Processor 202 may be any of various complex instruction set computing (CISC) processors, reduced instruction set computing (RISC) processors, very long instruction word (VLIW) processors, hybrids thereof, other types of processors, or may have a combination of different processors (e.g., in different cores).

During operation, processor 202 may receive no-locality hint memory access instruction 214. For example, the no-locality hint memory access instruction may be received from an instruction fetch unit, an instruction queue, or the like. The no-locality hint memory access instruction may represent a macroinstruction, assembly language instruction, machine code instruction, or other instruction or control signal of an instruction set of processor 202.

Referring still to FIG. 2, processor 202 includes a decode unit or decoder 230. Decode unit 230 may receive and decode no-locality hint memory access instruction 214. Decode unit 230 may output one or more microinstructions, micro-operations, micro-code entry points, decoded instructions or control signals, or other relatively lower-level instructions or control signals that reflect, represent, and/or are derived from the no-locality hint memory access instruction. The one or more lower-level instructions or control signals may implement the higher-level no-locality hint memory access instruction through one or more lower-level (e.g., circuit-level or hardware-level) operations. Decode unit 230 may be implemented using various different mechanisms including, but not limited to, microcode read only memories (ROMs), look-up tables, hardware implementations, programmable logic arrays (PLAs), and other mechanisms used to implement decode units known in the art.

Referring again to FIG. 2, processor 202 also includes a set of general-purpose registers 242 and a set of packed data registers 232. Each of the packed data registers may represent an on-die storage location that is operable to store packed data, vector data, or single instruction multiple data (SIMD) data. The registers may represent architecturally-visible registers (e.g., an architectural register file) that are visible to software and/or a programmer and/or are the registers indicated by instructions of an instruction set to identify operands. Execution unit 206 is coupled with decode unit 230 and registers 232, 242. Execution unit 206 may receive the one or more decoded or otherwise converted instructions or control signals that represent and/or are derived from the no-locality hint load instruction.

Execution unit 206 is operable in response to and/or as a result of the no-locality hint load instruction (e.g., in response to one or more instructions or control signals decoded directly or indirectly (e.g., through emulation) from the instruction) to access a location in the memory. Execution unit 206 may provide no-locality hint load operations 248 to one or more cache controllers 244. In some embodiments, there may be a single cache level and single cache controller (e.g., an L1 cache controller). In other embodiments, there may be two or more cache controllers (e.g., an L1 cache controller, an L2 cache controller, and optionally an L3 cache controller).

In some embodiments, if no-locality hint load operation 248 hits in cache 208, then the associated cache controller 244 may optionally return a sub-cache line amount of data from cache 208 (where the cache supports sub-cache line accesses such as a sectored cache). In various embodiments, the sub-cache line amount of data may be only half a cache line (e.g., only 256-bits of a 512-bit cache line), only one quarter a cache line (e.g., only 128-bits), only one eighth a cache line (e.g., only 64-bits), or only a single data element (e.g., 1 128-bit, 64-bit, 32-bit, 16-bit, or 8-bit data element). In other cases, on a cache hit, a full cache line may be returned.

Conversely, if no-locality hint load operation 248 misses in all cache(s) 208, then in response to request 249, the request for data may be sent to a memory controller 246. In some embodiments, memory controller 246 may perform a sub-cache line data access and return 250 from memory (e.g., external memory). And note that associated cache controller 244 may not allocate storage space in the cache for the requested data as it normally would for a regular load instruction (i.e., without a no-locality hint). In various embodiments, the sub-cache line data access and return 250 may be only half a cache line (e.g., only 256-bits), only one quarter a cache line (e.g., only 128-bits), only one eighth a cache line (e.g., only 64-bits), or only a single data element (e.g., a 64-bit, 32-bit, 16-bit, or 8-bit data element). That is, memory controller 246 may load data from the memory with a smaller sized access and data return than would ordinarily be used for a load operation without a no-locality hint (e.g., a conventional load operation). As one specific example, only one of a pair of 256-bit bus signals usually used to access an entire 512-bit cache line amount of data may be sent from memory controller 246 to the memory with the one sent being the one that includes the desired data element. In some embodiments, the minimum sized access and data return that is sufficient to contain the desired data element may optionally be used. Memory controller 246 may provide a sub-cache line data return 250 to cache controller(s) 244. The cache controllers may provide a corresponding sub-cache line amount of data 252 to execution unit 206. Thus in various embodiments, no-locality hint-included load instructions may cause both sub-cache line data access and direct return to a core, bypassing the cache hierarchy.

In embodiments, processor 202 includes a so-called sparse access buffer (SAB) 245, which is a memory structure that is included in or associated with memory controller 246. Memory controller 246 registers addresses of fine-grained accesses in this buffer. When a NL load reaches the memory controller, the memory controller looks up the buffer. A hit to a corresponding entry in SAB 245 implies locality (such as where data previously bypassed caches, but the line is now re-referenced). In one example, in response to this situation, the NL load request is selectively enabled to be treated as a regular load such that a full cache line is returned from memory as a selective full width return 251, and is inserted into caches to exploit the locality for the future accesses. In this way, information in SAB 245 may be used by memory controller 246 to selectively filter accesses with locality potential and insert their target data into caches as full cache lines, while bypassing accesses with no locality.

Embodiments may be used to handle partial cache line memory accesses without use of a sectored cache, which can simplify cache design. Also with an embodiment, locality potential can be exploited when present via cache storage. NL loads with the potential for locality include sparse data processing workloads that may exhibit locality potential based on the input datasets (e.g., size, type, topology, etc.).

In an embodiment the SAB structure is included in the memory controller to track the locality behavior at the memory side. With this arrangement, the SAB mainly observes low locality access traffic, as high locality accesses are filtered by caches. In contrast, core side tracking would receive an access stream with both high and low locality accesses. Hence, a memory side-configured SAB can provide much higher low-locality access tracking coverage for a given number of entries. As an example, even a SAB with as few as 32 entries can provide reasonable performance, whereas core side tracking may consume much larger numbers of entries, e.g., 256 k entries.

Sparse data structures are very common in big data analytics, machine learning and high-performance computing. These workloads sometimes have very large data structures that do not fit in caches. These large data structures are often indexed via sparse connectivity matrices, which leads to irregular accesses with poor spatial locality and reuse (e.g., a loop over A[B[i]], where A is large, and where B[i] may be completely random). Using fine-grain memory accesses via partial width loads improve the memory system performance by reducing bandwidth waste and cache pollution.

In an embodiment, instruction set architecture (ISA) support for no-locality loads may include special scalar loads and single instruction multiple data (SIMD) gathers that suggest no spatial or temporal locality. As a baseline system, the following semantics may be assumed for NL loads. NL loads are allowed on cacheable write-back memory with weak ordering semantics. This allows hardware to speculatively read data, and yet not insert (potentially partial) cache lines into the cache hierarchy for snooping.

Embodiments perform dynamic decision making to determine whether to comply with a NL hint or ignore the hint to store obtained data (which is potentially of a full width) in a cache hierarchy. Simply bypassing caches for every NL load access can lead to performance loss based on a few factors: (i) sparsely indexed data structures can be small enough to fit in caches, as programmers often do not know the input sizes beforehand; and (ii) sparse input data may exhibit different access distributions, unknown to the compiler or programmer. For example, the distribution may be uniformly random or, in the case of many social networking graphs, may exhibit a power law distribution, where there are a few hub nodes that see many re-references, but many leaf nodes with no reuse. Selectively inserting hub nodes into caches and bypassing leaf nodes would improve overall performance. As another factor, a programmer can misuse NL loads. A mechanism to detect locality potential for NL loads can override the NL behavior in these cases. As such a dynamic correction mechanism in accordance with an embodiment allows programmers to use NL load feature more freely.

In operation, a NL load flow begins like a regular load flow. If it hits in a cache, the hardware returns the cache line as usual, inserts the cache line to the cache(s) closer to the core, and updates usage bits (although insertion and replacement may be optimized based on the NL hint). In some embodiments, if there is already an outstanding miss for the same address, a NL load miss is coalesced with the outstanding load. If there is not any outstanding miss to the address of the NL load, it allocates a fill buffer such as a miss status holding register (MSHR) entry with a NL flag or indicator. If there is any incoming miss to an address that already has an outstanding NL load miss, the incoming miss will not depend on the outstanding miss with the NL flag to bring the cache line. The new miss can be stalled (as MSHR full), or the outstanding miss with the NL flag can be converted into a regular miss to be inserted into caches.

If an NL load misses all the caches and is to access memory, then the memory controller dynamically determines whether to perform this request as a regular full cache line memory access (via a selective override of the no-locality hint) or as a fine-grain (sub-cache line width) memory access (according to the no-locality hint). If a full cache line access occurs, the load flow is completed as usual, the cache line is returned such that the line inserted into cache(s), and the allocated MSHR entries updated. However, if the decision is to make a fine-grain memory access, then the memory controller returns the sub-cache line data directly to the core without inserting data into caches. Upon the completion of this miss, corresponding MSHR entries with the NL flag are cleared.

Figure 3:
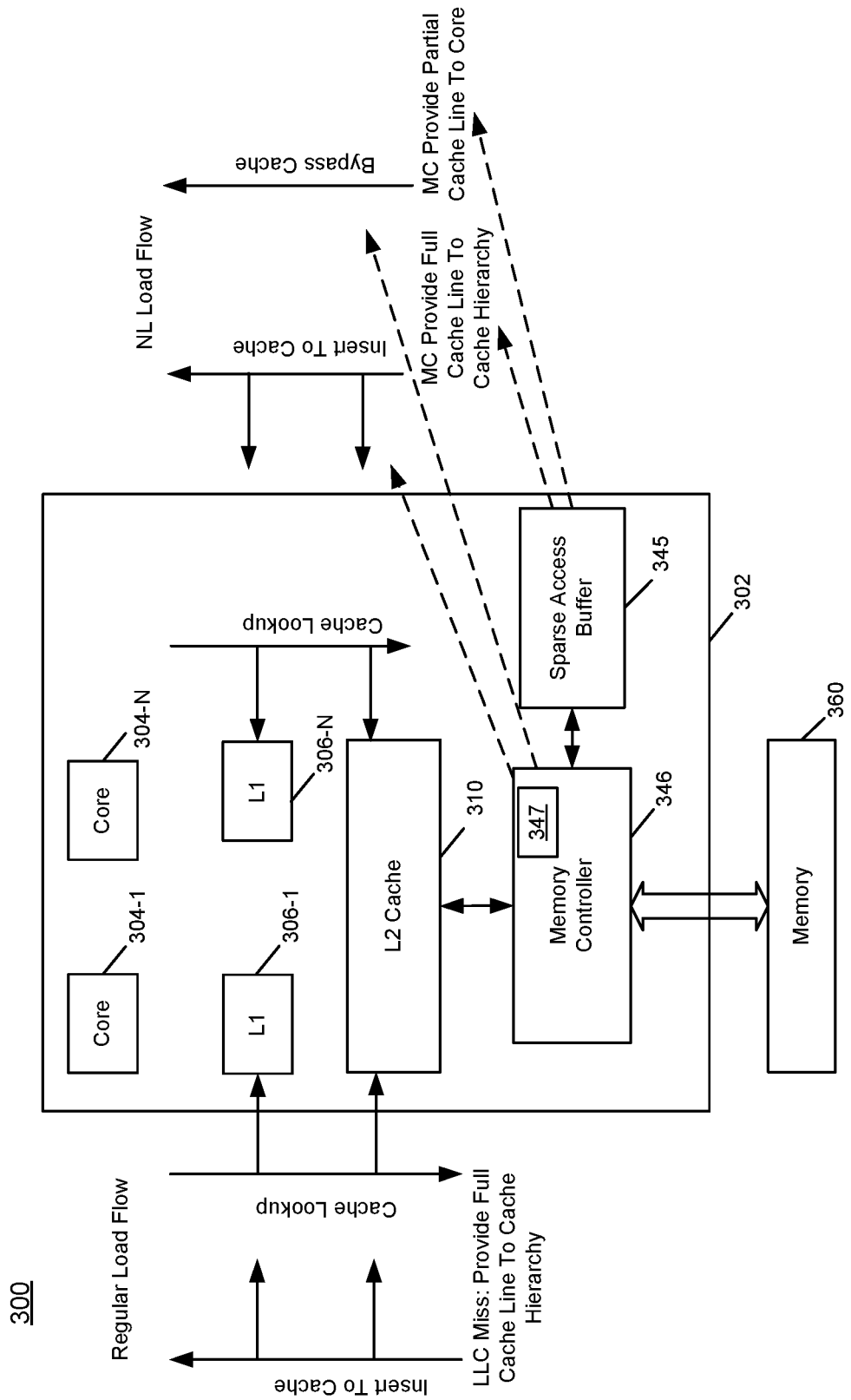
FIG. 3 is a block diagram of a system in accordance with an embodiment of the present invention.

Referring now to FIG. 3, shown is a block diagram of a system in accordance with an embodiment of the present invention. More specifically, system 300 includes a processor 302, namely a multicore processor. As seen, processor 302 includes a plurality of cores 304-1-304-N, with corresponding private cache memories (namely L1 caches) 306-1-306-N. In turn, these cache memories couple to a shared cache memory 310, which in an embodiment may be a L2 cache (and which may be a last level cache (LLC), in some cases). Cache memory 310 in turn couples to a memory controller 346. In the embodiment shown, memory controller 346 is coupled to a sparse access buffer 345. Although shown as separate components for ease of illustration, understand that in certain embodiments, sparse access buffer 345 may be implemented within memory controller 346. In any event, sparse access buffer 345 is separate from cores 304 as an uncore circuit component, and is thus not part of a coherent domain. In turn, memory controller 346 interfaces with a system memory 360, which in an embodiment may be any type of memory structure that can handle fine grain accesses.

Understand that memory controller 346 may further include a locality control circuit (locality controller) 347 that is configured to dynamically determine, in response to receipt of an NL load request, whether to handle such request as an NL load with NL load processing or to handle the request with full width load processing. As described herein, this determination may be based at least in part on information within sparse access buffer 345.

Still with reference to FIG. 3, shown are flows for regular load handling and NL load handling. Specifically, for a regular load, a load request is issued from a given core 304 and is provided to the cache hierarchy to determine whether the request hits in the cache hierarchy. If so, the data is returned. If a cache miss occurs, the request passes to memory controller 346 that issues a corresponding request to system memory 360 to obtain a full width of data (namely a full cache line). On this data return, memory controller 346 provides the data for insertion into the cache hierarchy and provision to requesting core 304.

In contrast, should a NL load request miss in the cache hierarchy, memory controller 346 accesses sparse access buffer 345 to determine whether to handle the request with NL processing or full width processing. If an address of the request hits within sparse access buffer 345 and an associated confidence value meets a threshold level, memory controller 346 may handle the request as a full width load, with handling as discussed above. Otherwise, memory controller 346 requests a partial width of data from system memory 360 and directly provides the returned data to requesting core 304, bypassing the cache hierarchy. Understand while shown at this high level in the embodiment of FIG. 3, many variations and alternatives are possible.

Figure 4:
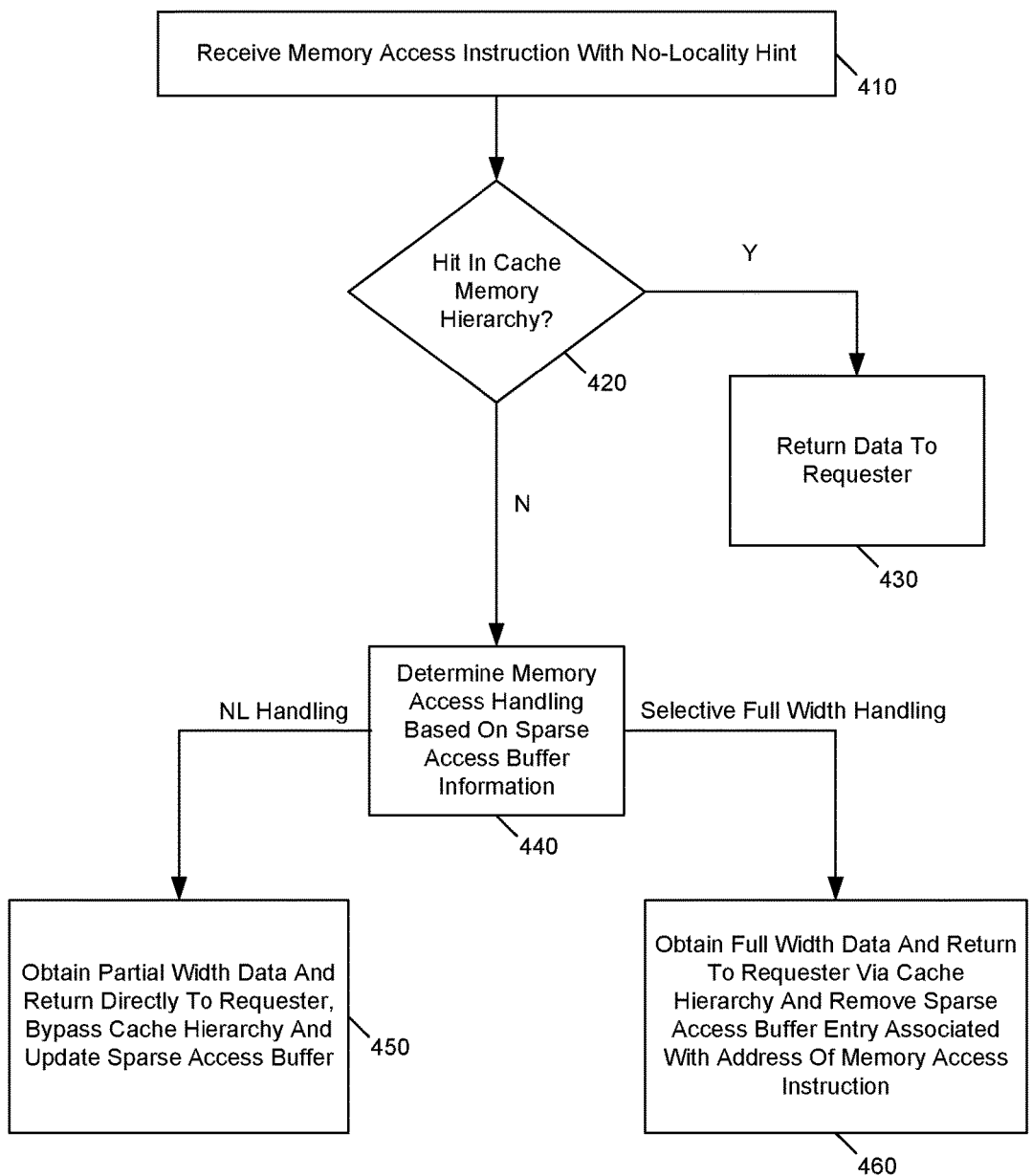
FIG. 4 is a flow diagram of a method in accordance with an embodiment of the present invention.

Referring now to FIG. 4, shown is a flow diagram of a method in accordance with an embodiment of the present invention. More specifically, method 400 may be performed by hardware circuitry, software, firmware, and/or combinations thereof. More specifically, method 400 may be performed by various logic and circuitry within a processor to handle a memory access instruction that has a no-locality hint. As illustrated, method 400 begins by receiving a memory access instruction having a no-locality hint (block 410). This instruction may be received within a decode unit of the processor, which decodes the instruction. In turn, control passes to diamond 420, where it is determined whether an address associated with this instruction hits within the cache memory hierarchy. If so, control passes to block 430 where the data is returned to the requester. Understand that additional processing, such as updating recency information of the hit cache line and so forth may occur.

Still with reference to FIG. 4, if the request misses within the cache memory hierarchy, control passes to block 440 where the type of memory access handling can be determined. More specifically at block 440, which may be performed in a locality controller of a memory controller, information from a sparse access buffer can be used to determine appropriate handling, as discussed above. If non-locality handling is to be performed, control passes to block 450 where partial width data is obtained and returned directly to the requester. This direct return of the partial width data to the requester (e.g., core) bypasses the cache hierarchy. Still further, information within the sparse access buffer may be updated. For example, if an entry already exists for an address associated with this memory access instruction, a confidence value may be updated (e.g., incremented). Or if no entry previously existed in the sparse access buffer, a new entry may be inserted for this address.

Depending on the implementation of the sparse access buffer, the partial width data itself also may be stored.

Referring still to FIG. 4, if instead selective full width handling is determined to be performed for this memory access instruction, control passes to block 460 where full width data may be obtained. This data may be provided to the requester via the cache memory hierarchy. Note also that if an entry existed in the sparse access buffer for this address, it may be removed. Understand while shown at this high level in the embodiment of FIG. 4, many variations and alternatives are possible.

Thus in embodiments the SAB may be used to dynamically detect potential locality for NL loads that miss in all the caches, e.g., by way of a fine-grain/full access decision. In response to a fine-grain memory access, an entry is allocated in the SAB. A new NL load that is received in the memory controller and hits in the SAB indicates that this address was accessed recently, but bypassed caches, and is now being re-referenced. In this case, a confidence indicator (e.g., one or more so-called confidence bits) to identify potential locality is incremented for that particular address. If the confidence level is high enough when the new NL load is received in the memory controller, then a regular full cache line memory access is performed and the data is inserted into caches to capture the locality for the next requests.

Figure 5:
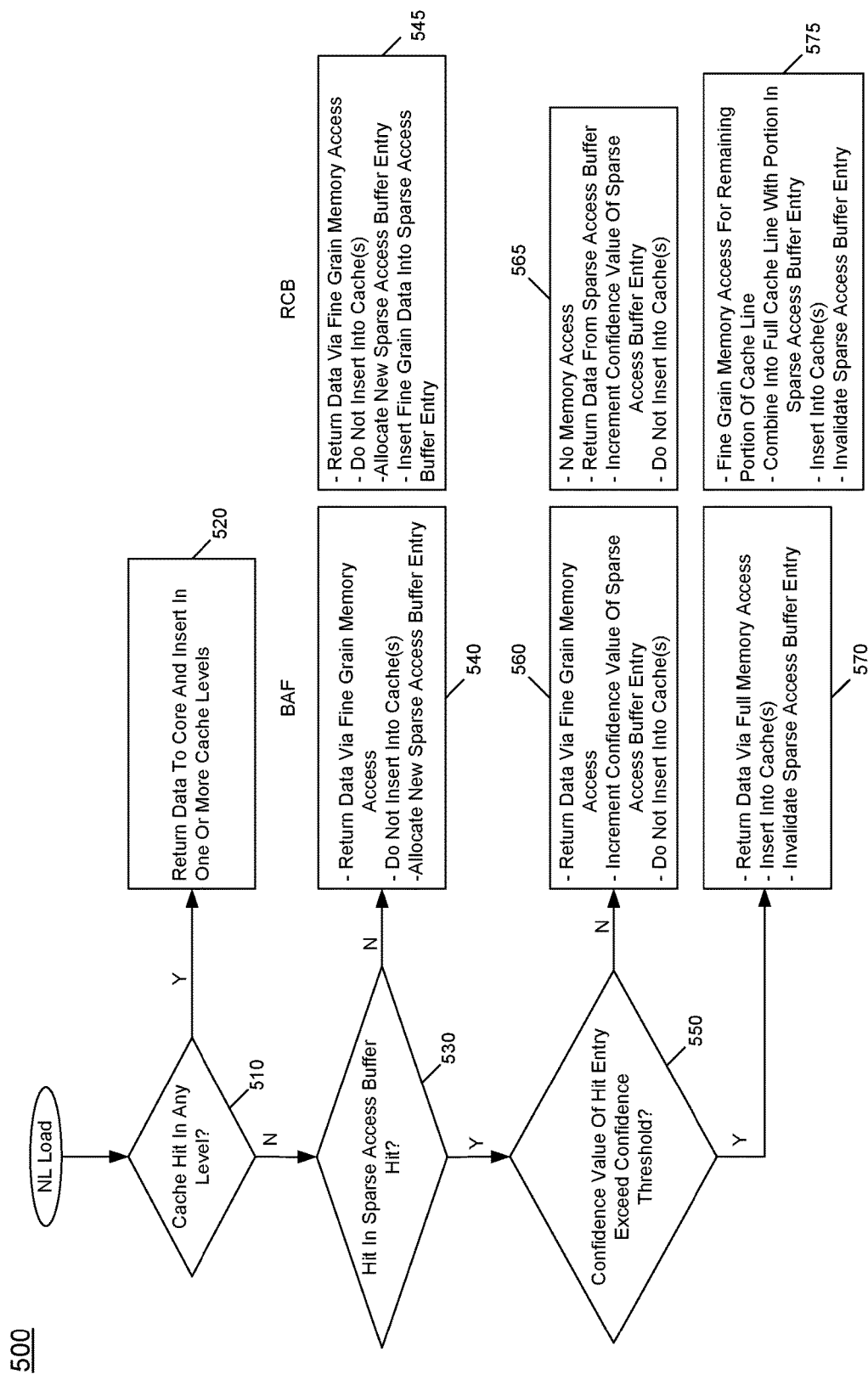
FIG. 5 is a flow diagram of a method in accordance with another embodiment of the present invention.

Referring now to FIG. 5, shown is a flow diagram of a method in accordance with another embodiment of the present invention. More specifically, method 500 sets forth handling within a processor of a load instruction having a no-locality hint. As such, method 500 may be performed by hardware circuitry, software, firmware, and/or combinations thereof.

As illustrated, method 500 begins by determining whether an address of the NL load instruction hits in any level of a cache hierarchy (diamond 510). If so, control passes to block 520 where data is returned to the core. Still further, depending upon processor implementation the hit data may also be inserted into one or more higher cache levels (namely one or more cache levels closer to the core). Instead if it is determined that the address of the NL load does not hit within any cache in the processor, control passes to diamond 530 to determine whether the address hits within a SAB.

If not, handling of this load request may occur with different flows depending upon whether the SAB is implemented as a bypassed address filter (BAF) or read combining buffer (RCB). In the case of a BAF, control passes to block 540 where the memory controller may issue a narrow data request (namely for sub-cache line width data) and upon receipt of the requested data from memory return the data directly to the core, bypassing the cache hierarchy. As such, this data is not inserted into any cache memory of the cache hierarchy. Still further, in this case of a miss within the SAB, a new SAB entry may be allocated for the address associated with this NL load. In this case of a miss within the SAB for an address associated with the NL load in the context of an RCB implementation, control instead passes to block 545. There, sub-cache line width data is directly to the core, bypassing the cache hierarchy. Still further, in this case of a miss within the SAB, a new SAB entry may be allocated for the address associated with this NL load and the partial width data itself may be stored within the allocated entry.

Still with reference to FIG. 5, if the address of the NL load hits within the SAB, control passes to diamond 550 to determine whether a confidence value of the hit entry exceeds a confidence threshold. In one embodiment, the confidence value may simply be a single bit that is set to one on the first hit to the entry of the SAB. In other cases, the confidence value may be implemented as multi-bit count information such that for each hit to this entry, the confidence value may be updated, e.g., by one.

In any event, if the confidence value does not exceed the confidence threshold, control passes to one of blocks 560 and 565 depending upon whether the SAB is implemented as a BAF (block 560) or RCB (block 565). As illustrated, for a BAF implementation, a partial width of data is returned to the core directly, bypassing the cache hierarchy and without insertion into any cache of the cache hierarchy. Furthermore, the confidence value of the entry is incremented. Instead for an RCB implementation the partial width of data is returned to the core directly from the SAB itself, bypassing the cache hierarchy. Furthermore, the confidence value of the entry is incremented.

Still with reference to FIG. 5 if instead it is determined that the confidence value of the hit entry exceeds the confidence threshold at diamond 550, control passes to one of blocks 570 and 575, depending upon SAB implementation. In the case of a BAF implementation, at block 570 the NL hint of this NL load is overridden or ignored such that the memory controller requests and receives a full width of data and returns this full width of data to the core. In an embodiment, this return includes insertion into one or more caches of the cache hierarchy, since with this override, a determination of locality has been made such that the data is likely to be used again with one or more of spatial and/or temporal locality. Furthermore at block 570 the memory controller may invalidate the SAB entry associated with the address of the NL load. In this way, additional space in the SAB may be used by another NL load for a different address. Instead for an RCB implementation, control passes to block 575, where the NL hint of this NL load is overridden or ignored such that the memory controller requests and receives the remaining data portion from memory and combines with the RCB-included portion to obtain a full width of data that is returned to the core (and inserted into one or more caches of the cache hierarchy). Furthermore at block 575 the memory controller may invalidate the SAB entry associated with the address of the NL load. Understand while shown at this high level in FIG. 5, many variations and alternatives are possible.

Various types of sparse access buffer implementations are possible. Although the scope of the present invention is not limited this regard, two possible implementations include a read combining buffer (RCB) and a bypassed address filter (BAF).

In one implementation, a RCB is a small memory side buffer included in or closely associated with the memory controller. Such RCB may include a plurality of entries to store bypassed addresses, locality confidence values, and the fine-grain accessed data. This buffer is outside the coherence domain of processor caches and it only stores the sub-cache line data from its memory channel that are not inserted into caches. The data in the RCB is accessed only when the corresponding address is not found in the cache hierarchy. Regular writes that are received in the memory controller (e.g., dirty evictions from caches) also check the RCB and update the content if the corresponding address is valid in the RCB.

When an NL load hits in the RCB, locality confidence values are incremented and the load is serviced from the RCB to the core without any external memory access. If the confidence value of the corresponding entry is high enough, then the remaining portion of the line is fetched from memory and combined with the portion that already exists in the RCB to form a cache line. Then this line is inserted into caches to capture the potential reuse for later accesses. When the line is inserted into caches it becomes part of the cache coherence domain, hence the corresponding entry is invalidated from the RCB, which is strictly exclusive of the CPU caches. Invalidating entries upon insertion into the cache hierarchy opens up space in the RCB to allocate new entries, minimizing forced evictions from the RCB and increasing the effective coverage for bypassed addresses. In an embodiment, the RCB can be organized as a set-associative cache to decrease the chance of conflict misses. Note that the RCB may be costly in terms of area since in embodiments it may keep full addresses, fine-grain data and metadata.

In another implementation the SAB may be implemented as a bypassed address filter (BAF), which may be configured as a small buffer included in or closely associated with the memory controller. This buffer keeps the set of addresses that recently bypassed the cache hierarchy, and can be used to make a fine-grain memory access decision. As opposed to the RCB, the BAF only holds addresses and confidence indicators, which may reduce area cost. When an NL load hits in the BAF, locality confidence indicators are incremented, and the data is fetched from memory via a fine-grain memory access if the locality confidence value does not meet a threshold. If the confidence value meets the threshold, then the request is serviced as a regular memory access to bring a full cache line, which is inserted into the cache hierarchy to capture reuse for future references. When a line is inserted into the caches, the corresponding entry is invalidated from the BAF which opens up space to allocate new entries, minimizing forced evictions from the BAF and increasing the effective coverage of bypassed addresses.

Note that with a BAF implementation, a memory access always occurs to fetch the fine-grain data. Moreover, for promoting accesses into full cache lines, the BAF fetches the entire cache line from memory. An RCB implementation may save memory bandwidth such that hits are served directly from the RCB and full cache line promotions only obtain the remaining portion of the cache line from memory. However, area footprint of a BAF implementation may be much smaller compared to the RCB, since it does not keep the sub-cache line data.

Moreover, the BAF may keep approximate information to decrease cost, without sacrificing correctness. Since the BAF only influences the fine grain access decision, a mistake will only result in reduced efficiency. Approximate information can be, e.g., in the form of storage of partial addresses in the BAF. This decreases the capacity requirement for the BAF, or can be used to increase the bypass address coverage with the same capacity. In the case of partial addresses, the BAF may report false positives (false hits). In other words, a reference address can match incorrectly to a partial address in the BAF. Such false positives can increase confidence values incorrectly, hence it can create a tendency to make full cache line access occur more often. This can be addressed by increasing the confidence threshold. Nevertheless, these false positives will not incur any correctness issues. Note that keeping partial addresses is not possible with an RCB implementation, since false positives could result in returning wrong data to the core.

If a full address (e.g., cache line address and block offset) is provided to the memory controller, then the SAB can be used to track both spatial and temporal locality. For example, assuming 8 byte (B) tracking granularity, for each 64B cache line, a SAB entry may include 8 confidence counters (note that a confidence counter can be as low as 1 bit). For each cache line, the sum of all counters may be combined to give the temporal locality confidence, and adjacent counters with non-zero confidence values may indicate spatial locality confidence for the bypassed addresses. The threshold for promoting an access to a regular full memory access is determined using these temporal/spatial confidence counters. In the simplest version, tracking granularity is matched to the cache line size and a single one bit counter is used. Hence, in this simplest configuration, an access is promoted to a full access after the first hit in the SAB (either temporal hit to the same chunk or a spatial hit to another chunk in the same cache line).

Figure 6:
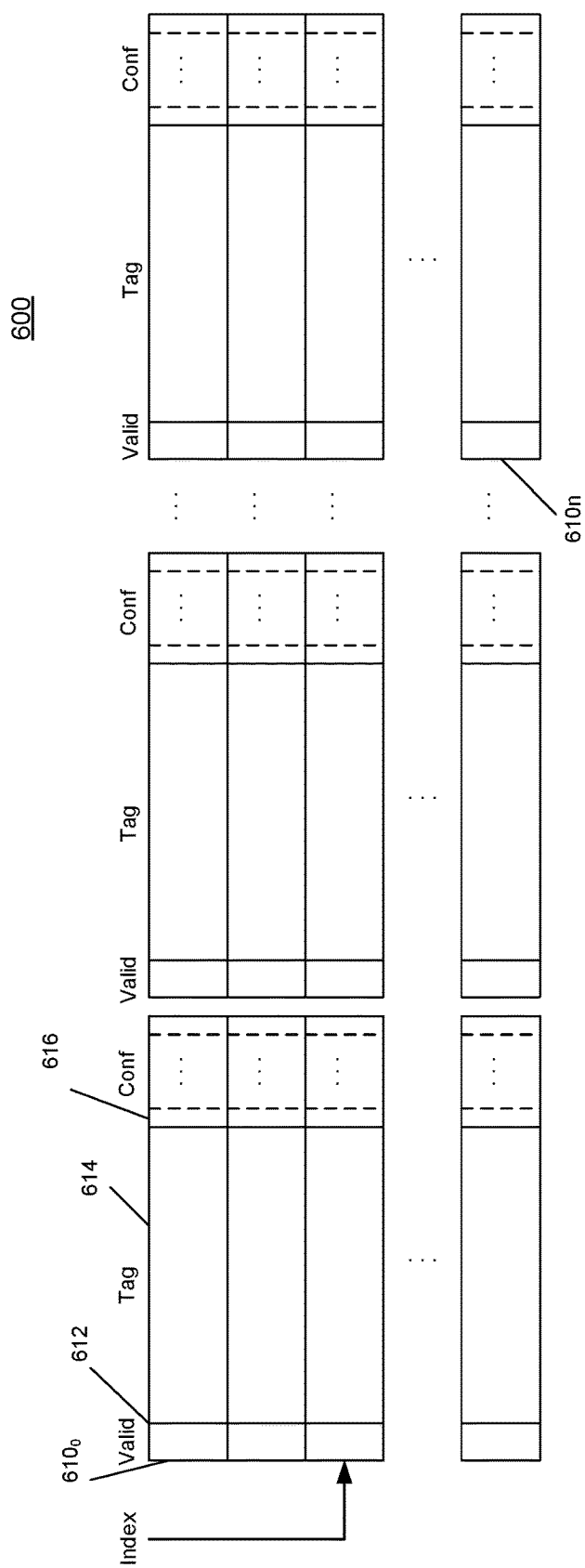
FIG. 6 is a block diagram of a sparse access buffer in accordance with an embodiment of the present invention.

Referring now to FIG. 6, shown is a block diagram of a sparse access buffer in accordance with an embodiment of the present invention. More specifically, FIG. 6 shows an embodiment of a SAB 600 in the form of a bypassed address filter in that SAB 600 does not include storage of partial width data. In this way, with a same-sized buffer, information regarding more addresses can be stored.

As illustrated, SAB 600 includes a plurality of entries $610_0$-$610_n$. As seen, each entry 610 includes multiple fields, including a valid field 612, a tag field 614, and a confidence field 616. In an embodiment, valid field 612 may be a single bit to indicate whether the given entry is valid or not (e.g., set to a logic 1 value to indicate that the entry is valid, and vice-versa). Tag field 614 may store at least a portion of an address of a given NL memory access instruction. As discussed above, this tag portion may only store a partial address in the interest of providing wider coverage at the expense of possible false positives. In turn, confidence field 616 may store one or more bits to provide confidence information. In the embodiment shown in FIG. 6, confidence field 616 may be a multi-counter field. For example, in a given embodiment, for an entry 610 that is associated with a 64 B cache line, 8 counters may be provided, each of which may be one or more bits. With this type of implementation, it is possible to determine temporal locality based on a sum of the count values of each of these counters. In turn, spatial locality can be determined by reference to adjacent counters that have non-zero values.

Different analyses of the values of these multiple counters are contemplated in different embodiments. For example, in one embodiment a memory controller (and more specifically a locality controller of such memory controller) may simply consider the sum of confidence values in determining whether a particular memory access instruction having a non-locality hint should be handled instead as a memory access instruction having locality (namely to be handled with a full width data return and storage in a cache hierarchy). In such cases, this sum of the confidence values can be compared to a given threshold and if the sum exceeds the threshold, locality-based handling may be selectively enabled.

In another embodiment, the memory controller (and more specifically the locality controller) may alternately determine to selectively enable locality-based handling where multiple neighboring ones of these counters have non-zero values, indicating spatial locality. In yet other embodiments, combinations of a counter sum technique and a neighboring counter value technique can be used. As such embodiments can use only spatial, only temporal, and/or combinations of temporal/spatial locality information to make full/partial access decisions.

Without an embodiment, simply bypassing all NL accesses can lead to increased memory traffic and reduced performance due to lost locality. By providing a SAB in accordance with an embodiment, high locality data may be selectively inserted into caches such that re-references are serviced from caches. Hence a SAB-based dynamic policy, which may be independently performed on a given cache line basis for each NL load, may provide a significant memory data traffic reduction and performance improvement compared to always bypassing fine-grain accesses.

Note that while embodiments described herein are primarily with regard to load operations, the scope of the present invention is not limited in this regard. This is so, as embodiments may also be used for handling write operations having no-locality hints with the same selective enabling operations. For conventional write operations, a full width cache line is received in the processor, and then at least a portion of the cache line is overwritten with new data. Thereafter, the full cache line width is written back to memory. In contrast, for a write operation having a no-locality hint, a narrow write request may be used to write only a portion of a cache line width to memory, which may involve the sub-cache line processing discussed above. The selective enabling of full width handling of such no-locality hint write operations may apply equally.

Embodiments to dynamically execute fine-grain memory accesses in different manners have many potential uses in HPC, big data analytics, machine learning, etc. Although the scope of the present invention is not limited in this regard, embodiments may be especially adapted for use with the particular workload such as page rank algorithms, sparse matrix vector multiply-based workloads, or stochastic gradient descent algorithms. This is the case, as irregular accesses to large data structures are very common in HPC, graph analytics, machine learning, etc. Therefore, memory performance can become a bottleneck in these applications. Embodiments enable fetching smaller granularity data from memory and bypassing caches when there is no locality. This operation improves cache utilization and reduces bandwidth waste, which can significantly improve the memory performance for such high value applications, while utilizing the fine-grain access capability provided by these memories efficiently. Dynamic execution can detect locality potential and turn fine-grain accesses into regular full cache line accesses. Hence a misuse of the fine-grain feature is corrected dynamically. This arrangement provides programmers more freedom to use these advanced features without worrying too much about negative performance impacts.

Figure 7:
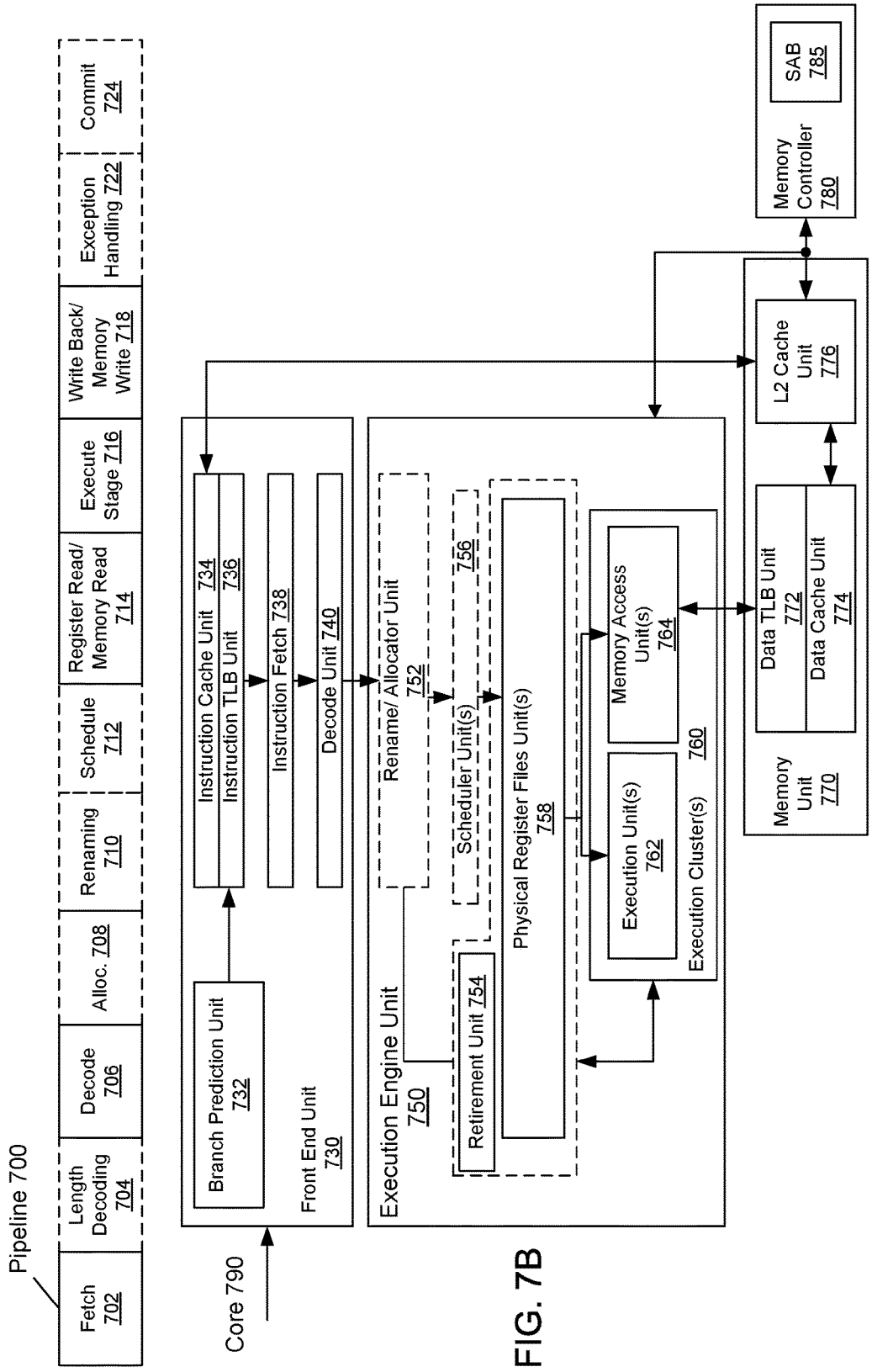
FIG. 7A is a block diagram of an exemplary in-order pipeline and an exemplary register renaming, out-of-order issue/execution pipeline to be included in a processor according to embodiments of the invention.
FIG. 7B is a block diagram illustrating both an exemplary embodiment of an in-order architecture core and an exemplary register renaming, out-of-order issue/execution architecture core to be included in a processor according to embodiments of the invention.

FIG. 7A is a block diagram illustrating both an exemplary in-order pipeline and an exemplary register renaming, out-of-order issue/execution pipeline to be included in a processor according to embodiments of the present invention. FIG. 7B is a block diagram illustrating both an exemplary embodiment of an in-order architecture core and an exemplary register renaming, out-of-order issue/execution architecture core to be included in a processor according to embodiments of the present invention. The solid lined boxes in FIGS. 7A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 7A, a processor pipeline 700 includes a fetch stage 702, a length decode stage 704, a decode stage 706, an allocation stage 708, a renaming stage 710, a scheduling (also known as a dispatch or issue) stage 712, a register read/memory read stage 714, an execute stage 716, a write back/memory write stage 718, an exception handling stage 722, and a commit stage 724.

FIG. 7B shows processor core 790 including a front end unit 730 coupled to an execution engine unit 750, and both are coupled to a memory unit 770. The core 790 may be a reduced instruction set computing (RISC) core, a complex instruction set computing (CISC) core, a very long instruction word (VLIW) core, or a hybrid or alternative core type. As yet another option, the core 790 may be a special-purpose core, such as, for example, a network or communication core, compression engine, coprocessor core, general purpose computing graphics processing unit (GPGPU) core, graphics core, or the like.

The front end unit 730 includes a branch prediction unit 732 coupled to an instruction cache unit 734, which is coupled to an instruction translation lookaside buffer (TLB) 736, which is coupled to an instruction fetch unit 738, which is coupled to a decode unit 740. The decode unit 740 (or decoder) may decode instructions, and generate as an output one or more micro-operations, micro-code entry points, microinstructions, other instructions, or other control signals, which are decoded from, or which otherwise reflect, or are derived from, the original instructions. The decode unit 740 may be implemented using various different mechanisms. Examples of suitable mechanisms include, but are not limited to, look-up tables, hardware implementations, programmable logic arrays (PLAs), microcode read only memories (ROMs), etc. In one embodiment, the core 790 includes a microcode ROM or other medium that stores microcode for certain macroinstructions (e.g., in decode unit 740 or otherwise within the front end unit 730). The decode unit 740 is coupled to a rename/allocator unit 752 in the execution engine unit 750.

The execution engine unit 750 includes the rename/allocator unit 752 coupled to a retirement unit 754 and a set of one or more scheduler unit(s) 756. The scheduler unit(s) 756 represents any number of different schedulers, including reservations stations, central instruction window, etc. The scheduler unit(s) 756 is coupled to the physical register file(s) unit(s) 758. Each of the physical register file(s) unit(s) 758 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 758 comprises a vector register unit, a write mask register unit, and a scalar register unit. These register units may provide architectural vector registers, vector mask registers, and general purpose registers. The physical register file(s) unit(s) 758 is overlapped by the retirement unit 754 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 754 and the physical register file unit(s) 758 are coupled to the execution cluster(s) 760. The execution cluster(s) 760 includes a set of one or more execution units 762 and a set of one or more memory access units 764. The execution units 762 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 756, physical register file(s) unit(s) 758, and execution cluster(s) 760 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 764). It should also be understood that where separate pipelines are used, one or more of these pipelines may be out-of-order issue/execution and the rest in-order.

The set of memory access units 764 is coupled to the memory unit 770, which includes a data TLB unit 772 coupled to a data cache unit 774 coupled to a level 2 (L2) cache unit 776. Instruction cache unit 734 and data cache unit 774 may together be considered to be a distributed L1 cache. In one exemplary embodiment, the memory access units 764 may include a load unit, a store address unit, and a store data unit, each of which is coupled to the data TLB unit 772 in the memory unit 770. The instruction cache unit 734 is further coupled to a level 2 (L2) cache unit 776 in the memory unit 770. The L2 cache unit 776 may be coupled to one or more other levels of cache and eventually to a main memory.

By way of example, the exemplary register renaming, out-of-order issue/execution core architecture may implement the pipeline 700 as follows: 1) the instruction fetch unit 738 performs the fetch and length decoding stages 702 and 704; 2) the decode unit 740 performs the decode stage 706; 3) the rename/allocator unit 752 performs the allocation stage 708 and renaming stage 710; 4) the scheduler unit(s) 756 performs the schedule stage 712; 5) the physical register file unit(s) 758 and the memory unit 770 perform the register read/memory read stage 714; the execution cluster 760 perform the execute stage 716; 6) the memory unit 770 and the physical register file(s) unit(s) 758 perform the write back/memory write stage 718; 7) various units may be involved in the exception handling stage 722; and 8) the retirement unit 754 and the physical register file(s) unit(s) 758 perform the commit stage 724.

The core 790 may support one or more instructions sets (e.g., the x86 instruction set (with some extensions that have been added with newer versions); the MIPS instruction set developed by MIPS Technologies of Sunnyvale, Calif.; the ARM instruction set (with optional additional extensions such as NEON) of ARM Holdings of Sunnyvale, Calif.), including the instruction(s) described herein. In one embodiment, the core 790 includes logic to support a packed data instruction set extension (e.g., AVX1, AVX2, and/or some form of the generic vector friendly instruction format (U=0 and/or U=1)), thereby allowing the operations used by many multimedia applications to be performed using packed data.

It should be understood that the core 790 may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading hereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 734/774 and a shared L2 cache unit 776, alternative embodiments may have a single internal cache for both instructions and data, such as, for example, a L1 internal cache, or multiple levels of internal cache. In some embodiments, the system may include a combination of an internal cache and an external cache that is external to the core and/or the processor. Alternatively, all of the caches may be external to the core and/or the processor.

It is further illustrated in FIG. 7B that the processor also includes a memory controller 780 which may perform the dynamic determinations described herein to potentially selectively override a no-locality hint of a memory access instruction and perform the memory access instruction as if it had locality (e.g., a full width load and return to core 790 via a cache hierarchy such as of memory unit 770). Instead, when memory controller 780 determines to handle a memory access according to the no-locality hint, partial width data may be obtained and returned directly to core 790, bypassing the cache hierarchy including memory unit 770. Note that in the embodiment shown in FIG. 7B, memory controller 780 includes a SAB 785.

Figure 8:
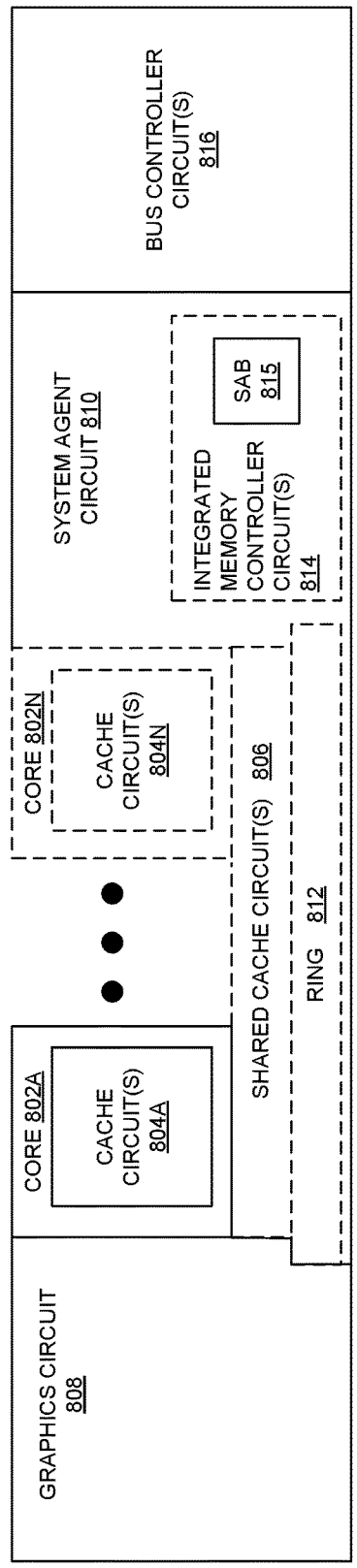
FIG. 8 is a block diagram of a single core processor and a multicore processor with integrated memory controller and graphics according to embodiments of the invention.

FIG. 8 is a block diagram of a processor 800 that may have more than one core, may have an integrated memory controller, and may have integrated graphics according to embodiments of the invention. The solid lined boxes in FIG. 8 illustrate a processor 800 with a single core 802A, a system agent circuit 810, a set of one or more bus controller circuits 816, while the optional addition of the dashed lined boxes illustrates an alternative processor 800 with multiple cores 802A-N, and a set of one or more integrated memory controller circuit(s) 814 in the system agent circuit 810. Integrated memory controller circuits 814 may include one or more SABs 815 as described herein to enable the memory controller to dynamically determine whether to selectively enable locality-based handling for incoming memory access requests having no-locality hints. As further illustrated in FIG. 8, processor 800 also includes a graphics circuit 808 to portion graphics integrated within processor 800N.

Processor 800 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, accelerator device, or the like. The processor may be implemented on one or more chips. The processor 800 may be a part of and/or may be implemented on one or more substrates using any of a number of process technologies, such as, for example, BiCMOS, CMOS, or NMOS.

The memory hierarchy includes one or more levels of cache circuits 804A-N (including L1 cache) within the cores 802A-N, a set of one or more shared cache circuits 1006, and external memory (not shown) coupled to the set of integrated memory controller circuits 814. The set of shared cache circuits 806 may include one or more mid-level caches, such as level 2 (L2), level 3 (L3), level 4 (L4), or other levels of cache, a last level cache (LLC), and/or combinations thereof. While in one embodiment a ring-based interconnect circuit 812 interconnects graphics circuit 808, the set of shared cache units 806, and the system agent circuit 810/integrated memory controller circuit(s) 814, alternative embodiments may use any number of well-known techniques for interconnecting such circuits. In one embodiment, coherency is maintained between one or more cache circuit 806 and cores 802A-N.

In some embodiments, one or more of the cores 802A-N are capable of multi-threading. The system agent circuit 810 includes those components coordinating and operating cores 802A-N. The system agent circuit 810 may include for example a power control unit (PCU) and a display unit. The PCU may be or include logic and components for regulating the power state of the cores 802A-N and/or the graphics circuit 808. The display unit may be for driving one or more externally connected displays.

The cores 802A-N may be homogenous or heterogeneous in terms of architecture instruction set; that is, two or more of the cores 802A-N may be capable of execution of the same instruction set, while others may be capable of executing only a subset of that instruction set or a different instruction set. In one embodiment, the cores 802A-N are heterogeneous and include both the "small" cores and "big" cores described below.

Figure 9:
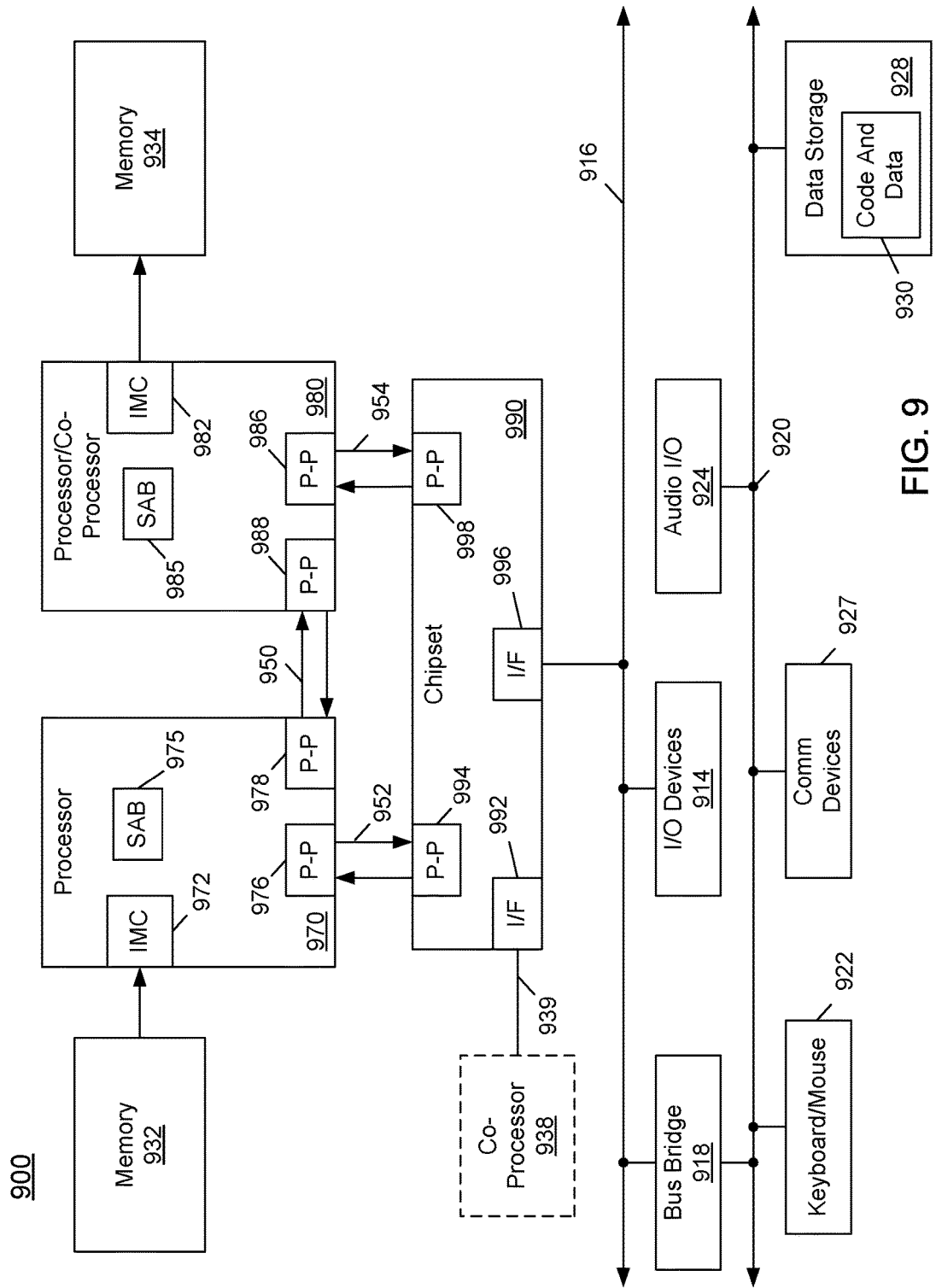
FIG. 9 illustrates a block diagram of a system in accordance with an embodiment of the present invention.

FIG. 9 is block diagram of an exemplary computer architecture. Other system designs and configurations known in the arts for laptops, desktops, tablets, handheld PCs, personal digital assistants, engineering workstations, servers, network devices, network hubs, switches, embedded processors, digital signal processors (DSPs), graphics devices, video game devices, set-top boxes, micro controllers, cell phones, smartphones, portable media players, hand held devices, and various other electronic devices, are also suitable. In general, a huge variety of systems or electronic devices capable of incorporating a processor and/or other execution logic as disclosed herein are generally suitable.

Referring now to FIG. 9, shown is a block diagram of an exemplary system 900 in accordance with an embodiment of the present invention. As shown in FIG. 9, multiprocessor system 900 is a point-to-point interconnect system, and includes a first processor 970 and a second processor 980 coupled via a point-to-point interconnect 950. Each of processors 970 and 980 may be some version of the processor 800 of FIG. 8.

Processors 970 and 980 are shown including integrated memory controller (IMC) units 972 and 982, respectively. Processor 970 also includes as part of its bus controller units point-to-point (P-P) interfaces 976 and 978; similarly, second processor 980 includes P-P interfaces 986 and 988. As seen, processors 970, 980 further include SABs 975, 985 as described herein. Processors 970, 980 may exchange information via a point-to-point (P-P) interface 950 using P-P interface circuits 978, 988. As shown in FIG. 9, IMCs 972 and 982 couple the processors to respective memories, namely a memory 932 and a memory 934, which may be portions of main memory locally attached to the respective processors.

Processors 970, 980 may each exchange information with a chipset 990 via individual P-P interfaces 952, 954 using point to point interface circuits 976, 994, 986, 998. Chipset 990 may optionally exchange information with the coprocessor 938 via a high-performance interface 939 using point-to-point interface circuit 992. In one embodiment, the coprocessor 938 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 990 may be coupled to a first bus 916 via an interface 996. In one embodiment, first bus 916 may be a Peripheral Component Interconnect (PCI) bus, or a bus such as a PCI Express bus or another third generation I/O interconnect bus, although the scope of the present invention is not so limited.

As shown in FIG. 9, various I/O devices 914 may be coupled to first bus 916, along with a bus bridge 918 which couples first bus 916 to a second bus 920. In one embodiment, one or more additional processor(s) 915, such as coprocessors, high-throughput MIC processors, GPGPU's, accelerators (such as, e.g., graphics accelerators or digital signal processing (DSP) units), field programmable gate arrays, or any other processor, are coupled to first bus 916. In one embodiment, second bus 920 may be a low pin count (LPC) bus. Various devices may be coupled to a second bus 920 including, for example, a keyboard and/or mouse 922, communication devices 927 and a storage unit 928 such as a disk drive or other mass storage device which may include instructions/code and data 930, in one embodiment. Further, an audio I/O 924 may be coupled to the second bus 920. Note that other architectures are possible. For example, instead of the point-to-point architecture of FIG. 9, a system may implement a multi-drop bus or other such architecture.

Figure 10:
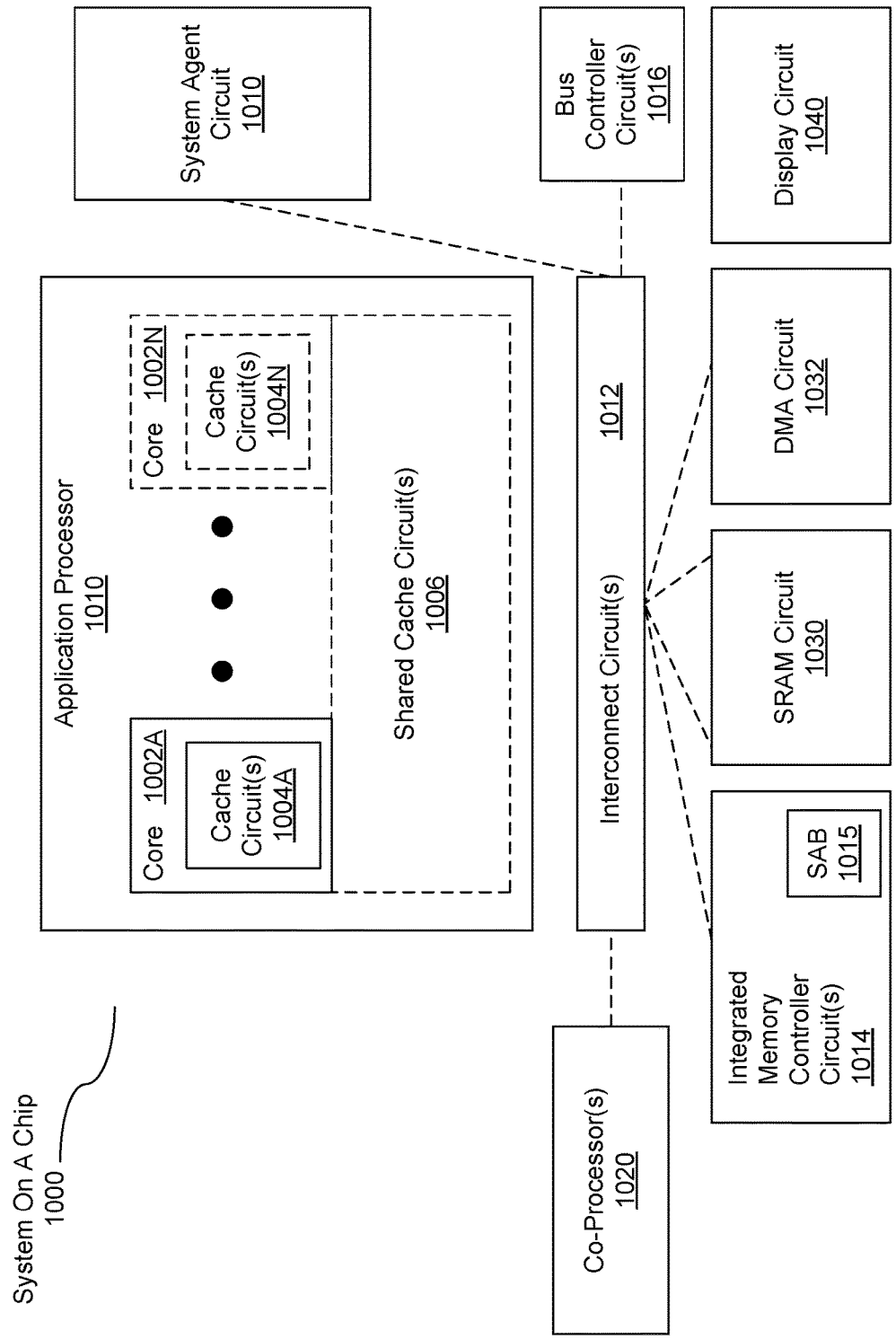
FIG. 10 illustrates a block diagram of a system on a chip (SoC) in accordance with an embodiment of the present invention.

Referring now to FIG. 10, shown is a block diagram of a SoC 1000 in accordance with an embodiment of the present invention. Also, dashed lined boxes are optional features on more advanced SoCs. In FIG. 10, an interconnect circuit(s) 1012 is coupled to: an application processor 1010 which includes a set of one or more cores 1002A-N having cache circuit(s) 1004A-1004N, and shared cache circuit(s) 1006; a system agent circuit 1010; a bus controller circuit(s) 1016; an integrated memory controller circuit(s) 1014, which may include a SAB 1015 as described herein; a set of one or more coprocessors 1020 which may include integrated graphics logic, an image processor, an audio processor, and a video processor; a static random access memory (SRAM) circuit 1030; a direct memory access (DMA) circuit 1032; and a display circuit 1040 for coupling to one or more external displays. In one embodiment, the coprocessor(s) 1020 include a special-purpose processor, such as, for example, a network or communication processor, compression engine, GPGPU, a high-throughput MIC processor, embedded processor, or the like. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a non-transitory machine-readable medium which represents various logic within the processor, which when read by a machine causes the machine to fabricate logic to perform the techniques described herein. Such representations, known as "IP cores" may be stored on a tangible non-transitory, machine readable medium and supplied to various customers or manufacturing facilities to load into the fabrication machines that actually make the logic or processor. Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 11 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 11 shows a program in a high level language 1102 may be compiled using an x86 compiler 1104 to generate x86 binary code 1106 that may be natively executed by a processor with at least one x86 instruction set core 1116. The processor with at least one x86 instruction set core 1116 represents any processor that can perform substantially the same functions as an Intel processor with at least one x86 instruction set core by compatibly executing or otherwise processing (1) a substantial portion of the instruction set of the Intel® x86 instruction set core or (2) object code versions of applications or other software targeted to run on an Intel processor with at least one x86 instruction set core, in order to achieve substantially the same result as an Intel® processor with at least one x86 instruction set core. The x86 compiler 1104 represents a compiler that is operable to generate x86 binary code 1106 (e.g., object code) that can, with or without additional linkage processing, be executed on the processor with at least one x86 instruction set core 1116. Similarly, FIG. 11 shows the program in the high level language 1302 may be compiled using an alternative instruction set compiler 1108 to generate alternative instruction set binary code 1110 that may be natively executed by a processor without at least one x86 instruction set core 1114 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1112 is used to convert the x86 binary code 1106 into code that may be natively executed by the processor without an x86 instruction set core 1114. This converted code is not likely to be the same as the alternative instruction set binary code 1110 because an instruction converter capable of this is difficult to make; however, the converted code will accomplish the general operation and be made up of instructions from the alternative instruction set. Thus, the instruction converter 1112 represents software, firmware, hardware, or a combination thereof that, through emulation, simulation or any other process, allows a processor or other electronic device that does not have an x86 instruction set processor or core to execute the x86 binary code 1106.

The following examples pertain to further embodiments.

In one example, a processor comprises: a core including a decode unit to decode a memory access instruction having a no-locality hint to indicate that data associated with the memory access instruction has at least one of non-spatial locality and non-temporal locality; a sparse access buffer having a plurality of entries each to store, for a memory access instruction to a particular address, address information and count information; and a memory controller to issue requests to a memory, the memory controller including a locality controller to receive the memory access instruction having the no-locality hint and override the no-locality hint based at least in part on the count information stored in an entry of the sparse access buffer.

In an example, the no-locality hint is to cause a return of data to the core that bypasses a cache memory of the processor.

In an example, in response to the override of the no-locality hint, the memory controller is to cause a full width data portion to be obtained from the memory and provided to the core.

In an example, in response to a hit to the sparse access buffer, the memory controller is to cause a sub-cache line data portion to be provided to the core without an access to the memory.

In an example, in response to the no-locality hint, the memory controller is to cause a sub-cache line data portion to be obtained from the memory and provided to the core.

In an example, the sparse access buffer comprises a read combining buffer, the read combining buffer having the plurality of entries, where the plurality of entries are further to store a sub-cache line data portion for a memory access instruction.

In an example, in response to a second memory access instruction that hits a first entry of the sparse access buffer having the count information that exceeds a threshold, the memory controller is to obtain a remainder of a cache line associated with the second memory access instruction, combine the remainder of the cache line and the sub-cache line data portion and send a full cache line width of data to the core.

In an example, the sparse access buffer comprises a bypassed address filter to store information in the plurality of entries associated with memory access instructions having the no-locality hint handled in the memory controller that bypassed the cache memory.

In an example, the count information comprises confidence information, the sparse access buffer to update the confidence information of a first entry in response to the memory access instruction hit to the first entry.

In an example, the memory controller is to insert an entry in the sparse access buffer in response to a miss in a cache hierarchy of the processor of a second memory access instruction having the no-locality hint.

In another example, a method comprises: in response to a miss of a memory access request having a no-locality hint in a cache hierarchy of a processor, determining if the memory access request hits in a sparse access buffer of the processor, the sparse access buffer to store information associated with memory access requests having no-locality hints; and if the memory access request hits in the sparse access buffer and a confidence value of a hit entry of the sparse access buffer exceeds a threshold, returning a full width of data to the processor.

In an example, the method further comprises if the memory access request hits in the sparse access buffer and the confidence value of the hit entry of the sparse access buffer is less than the threshold, returning a partial width of data to the processor, and updating the confidence value of the hit entry.

In an example, the method further comprises returning the partial width of data from the sparse access buffer directly to the processor without communication with the memory.

In an example, the method further comprises if the memory access request does not hit in the sparse access buffer, returning a partial width of data to the processor and allocating a new entry in the sparse access buffer for the memory access request.

In an example, the method further comprises returning the partial width of data to the processor via a bypass path that bypasses the cache hierarchy of the processor.

In another example, a computer readable medium including instructions is to perform the method of any of the above examples.

In another example, a computer readable medium including data is to be used by at least one machine to fabricate at least one integrated circuit to perform the method of any one of the above examples.

In another example, an apparatus comprises means for performing the method of any one of the above examples.

In another example, a system comprises: a processor having a core to process a memory access instruction having a no-locality hint to indicate non-locality of data associated with the memory access instruction and a cache hierarchy including one or more cache memories coupled to the core; a memory controller to issue requests to a system memory, the memory controller including a locality controller to receive the memory access instruction having the no-locality hint and to selectively handle the memory access instruction with locality based at least in part on a locality prediction associated with the data; and the system memory coupled to the memory controller.

In an example, the system further comprises a sparse access buffer having a plurality of entries each to store, for a memory access instruction to a particular address, address information and a confidence value, where the memory controller is to generate the locality prediction based at least in part on the confidence value.

In an example, in response to the selective handle of the memory access instruction with locality, the memory controller is to issue a request to the system memory for a full width of the data and store the full width of the data in the cache hierarchy.

In an example, in response to the memory access instruction having the no-locality hint, the memory controller is to issue a request to the system memory for a partial width of the data and bypass storage of the partial width of the data in the cache hierarchy.

In an example, the processor further comprises the memory controller.

In a still further example, an apparatus comprises: means for decoding a memory access instruction having a no-locality hint to indicate that data associated with the memory access instruction has at least one of non-spatial locality and non-temporal locality; buffer means having a plurality of entries each for storing, for a memory access instruction to a particular address, address information and count information; and memory control means for issuing requests to a memory means, the memory control means comprising a locality control means for receiving the memory access instruction having the no-locality hint and overriding the no-locality hint based at least in part on the count information stored in an entry of the buffer means.

In an example, the no-locality hint is to cause a return of data that bypasses one or more cache means.

In an example, in response to the override of the no-locality hint, the memory control means for causing a full width data portion to be obtained from the memory means, and in response to a hit to the buffer means, the memory control means for causing a sub-cache line data portion to be obtained without an access to the memory means.

In an example, the buffer means comprises a read combining buffer, the read combining buffer having the plurality of entries, where the plurality of entries are further to store a sub-cache line data portion for a memory access instruction.

In an example, the buffer means comprises a bypassed address filter to store information in the plurality of entries associated with memory access instructions having the no-locality hint handled in the memory control means that bypassed one or more cache means.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
a core including a decode unit to decode a memory access instruction having a no-locality hint to indicate that data associated with the memory access instruction has at least one of non-spatial locality and non-temporal locality;
a sparse access buffer having a plurality of entries each to store, for a memory access instruction to a particular address, address information and count information; and
a memory controller to issue requests to a memory, the memory controller including a locality controller to receive the memory access instruction having the no-locality hint and override the no-locality hint based at least in part on the count information stored in an entry of the sparse access buffer.

2. The processor of claim 1, wherein the no-locality hint is to cause a return of data to the core that bypasses a cache memory of the processor.

3. The processor of claim 1, wherein in response to the override of the no-locality hint, the memory controller is to cause a full width data portion to be obtained from the memory and provided to the core.

4. The processor of claim 1, wherein in response to a hit to the sparse access buffer, the memory controller is to cause a sub-cache line data portion to be provided to the core without an access to the memory.

5. The processor of claim 1, wherein in response to the no-locality hint, the memory controller is to cause a sub-cache line data portion to be obtained from the memory and provided to the core.

6. The processor of claim 5, wherein the sparse access buffer comprises a read combining buffer, the read combining buffer having the plurality of entries, wherein the plurality of entries are further to store a sub-cache line data portion for a memory access instruction.

7. The processor of claim 6, wherein in response to a second memory access instruction that hits a first entry of the sparse access buffer having the count information that exceeds a threshold, the memory controller is to obtain a remainder of a cache line associated with the second memory access instruction, combine the remainder of the cache line and the sub-cache line data portion and send a full cache line width of data to the core.

8. The processor of claim 1, wherein the sparse access buffer comprises a bypassed address filter to store information in the plurality of entries associated with memory access instructions having the no-locality hint handled in the memory controller that bypassed the cache memory.

9. The processor of claim 1, wherein the count information comprises confidence information, the sparse access buffer to update the confidence information of a first entry in response to the memory access instruction hit to the first entry.

10. The processor of claim 1, wherein the memory controller is to insert an entry in the sparse access buffer in response to a miss in a cache hierarchy of the processor of a second memory access instruction having the no-locality hint.

11. A non-transitory machine-readable medium having stored thereon instructions, which if performed by a machine, cause the machine to perform a method comprising:

in response to a miss of a memory access request having a no-locality hint in a cache hierarchy of a processor, determining if the memory access request hits in a sparse access buffer of the processor, the sparse access buffer to store information associated with memory access requests having no-locality hints; and
if the memory access request hits in the sparse access buffer and a confidence value of a hit entry of the sparse access buffer exceeds a threshold, returning a full width of data to the processor.

12. The non-transitory machine-readable medium of claim 11, wherein the method further comprises if the memory access request hits in the sparse access buffer and the confidence value of the hit entry of the sparse access buffer is less than the threshold, returning a partial width of data to the processor, and updating the confidence value of the hit entry.

13. The non-transitory machine-readable medium of claim 12, wherein the method further comprises returning the partial width of data from the sparse access buffer directly to the processor without communication with the memory.

14. The non-transitory machine-readable medium of claim 11, wherein the method further comprises if the memory access request does not hit in the sparse access buffer, returning a partial width of data to the processor and allocating a new entry in the sparse access buffer for the memory access request.

15. The non-transitory machine-readable medium of claim 14, wherein the method further comprises returning the partial width of data to the processor via a bypass path that bypasses the cache hierarchy of the processor.

16. A system comprising:
a processor having a core to process a memory access instruction having a no-locality hint to indicate non-locality of data associated with the memory access instruction and a cache hierarchy including one or more cache memories coupled to the core;
a memory controller to issue requests to a system memory, the memory controller including a locality controller to receive the memory access instruction having the no-locality hint and to selectively handle the memory access instruction with locality based at least in part on a locality prediction associated with the data, wherein in response to the memory access instruction having the no-locality hint, the memory controller is to issue a request to the system memory for a partial width of the data and bypass storage of the partial width of the data in the cache hierarchy; and
the system memory coupled to the memory controller.

17. The system of claim 16, further comprising a sparse access buffer having a plurality of entries each to store, for a memory access instruction to a particular address, address information and a confidence value, wherein the memory controller is to generate the locality prediction based at least in part on the confidence value.

18. The system of claim 16, wherein in response to the selective handle of the memory access instruction with locality, the memory controller is to issue a request to the system memory for a full width of the data and store the full width of the data in the cache hierarchy.

19. The system of claim 16, wherein the processor further comprises the memory controller.

* * * * *